(12) United States Patent
Tomasson et al.

(10) Patent No.: US 7,578,768 B2
(45) Date of Patent: Aug. 25, 2009

(54) VEHICLE IGNITION SWITCH

(75) Inventors: Kris Tomasson, Corona del Mar, CA (US); Brian White, Rancho Santa Margarita, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 11/620,267

(22) Filed: Jan. 5, 2007

(65) Prior Publication Data
US 2008/0167162 A1 Jul. 10, 2008

(51) Int. Cl.
*F16H 61/26* (2006.01)
(52) U.S. Cl. ............................................. 477/165
(58) Field of Classification Search ............... 74/473.1; 477/165
See application file for complete search history.

(56) References Cited

U.S. PATENT DOCUMENTS 6,038,937 A * 3/2000 Van Order et al. ......... 74/473.1
6,186,021 B1 2/2001 Wollschlaeger

* cited by examiner

*Primary Examiner*—Dirk Wright
(74) *Attorney, Agent, or Firm*—Frank MacKenzie; Brooks Kushman P.C.

(57) ABSTRACT

A vehicle shifter assembly is disclosed which is mounted in an interior of a vehicle in operable connection with a vehicle transmission for selecting a mode of the transmission. The shifter has a base member, an ignition button, and a cover. The base member is mounted to the vehicle interior and translatable relative to the vehicle interior. The ignition button is provided on a top surface of the base member and operably connected to an engine of the vehicle such that actuation of the ignition button starts the engine of the vehicle. The cover is pivotably connected to the top surface of the base member to generally cover the ignition button. The cover has a closed position and an opened position.

20 Claims, 3 Drawing Sheets

# VEHICLE IGNITION SWITCH

BACKGROUND OF THE INVENTION

1. Field of the Invention

Various embodiments of the present invention relate to vehicle ignition switches.

2. Background Art

In a manual transmission vehicle, a shifter is generally provided to permit a driver to shift and thereby select a gear for the transmission. The shifter is mounted within an interior of the vehicle and generally located in proximate the center of the vehicle interior for operation by the driver.

In an automatic transmission vehicle, a shifter is typically mounted within the interior of the vehicle to allow a driver to select a mode of operation for the vehicle, including reverse, neutral, drive, and various gears. Once a driver of the automatic transmission vehicle moves the shifter assembly into the drive position, no additional shifting is typically required. Since no additional shifting is required of the driver, the shifter assembly in an automatic transmission vehicle may be located in various positions throughout the interior of the vehicle. For example, the shifter assembly is typically mounted extending from a steering wheel column, a center console, or a floorboard of the vehicle.

In addition to a shifter assembly, a vehicle generally requires an ignition switch in operable connection with an engine of the vehicle to start the engine. Generally a key is used to operate the ignition switch and start the engine of the vehicle. The ignition may also be actuated by an electronic signal from a transmitter or a button provided in the interior of the vehicle.

SUMMARY OF THE INVENTION

In one embodiment of the invention, a shifter assembly is mounted in an interior of a vehicle, in operable connection with a vehicle transmission for selecting a mode of the transmission. The shifter has a base member, an ignition button, and a cover. The base member is mounted to the vehicle interior and is translatable relative to the vehicle interior. The ignition button is mounted on a top surface of the base member and operatively connected to an engine of the vehicle such that actuation of the ignition button starts the engine of the vehicle. The cover is pivotally connected to the top surface of the base member to generally cover the ignition button and has a closed position and an opened position.

In another embodiment, a vehicle is provided with a shifter, an ignition button, a cover, and a release button. The shifter is mounted in an interior of the vehicle in operable connection with the vehicle transmission for selecting a mode of the transmission. The shifter is translatable relative to the vehicle interior. The ignition button is mounted on a top surface of the shifter and is operably connected to an engine of the vehicle so that the actuation of ignition button starts the engine of the vehicle. The cover is pivotably connected to the top surface of the shifter to generally cover the ignition button. The cover has a closed position and an opened position. The release button is mounted in the vehicle interior a distance from the shifter. The release button is in operative connection with the cover to retain the cover in the closed position and release the cover to the opened position upon activation thereof.

In yet another embodiment, a vehicle is provided with a shifter, an ignition button, and a cover. The shifter is mounted in an interior of the vehicle in operable connection with a vehicle transmission for selecting a mode of the transmission. The shifter is translatable relative to the vehicle interior. The ignition button is mounted on a top surface of the shifter and operatively connected to an engine of the vehicle such that actuation of the ignition button starts the engine of the vehicle. The cover is pivotably connected to the top surface of the shifter to generally cover the ignition button. The cover has a closed position and an opened position. A predetermined force is required to actuate the cover from the closed position to the opened position.

The above embodiments, and other embodiments, objects, features, and advantages of the present invention are readily apparent from the following detailed description of the embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
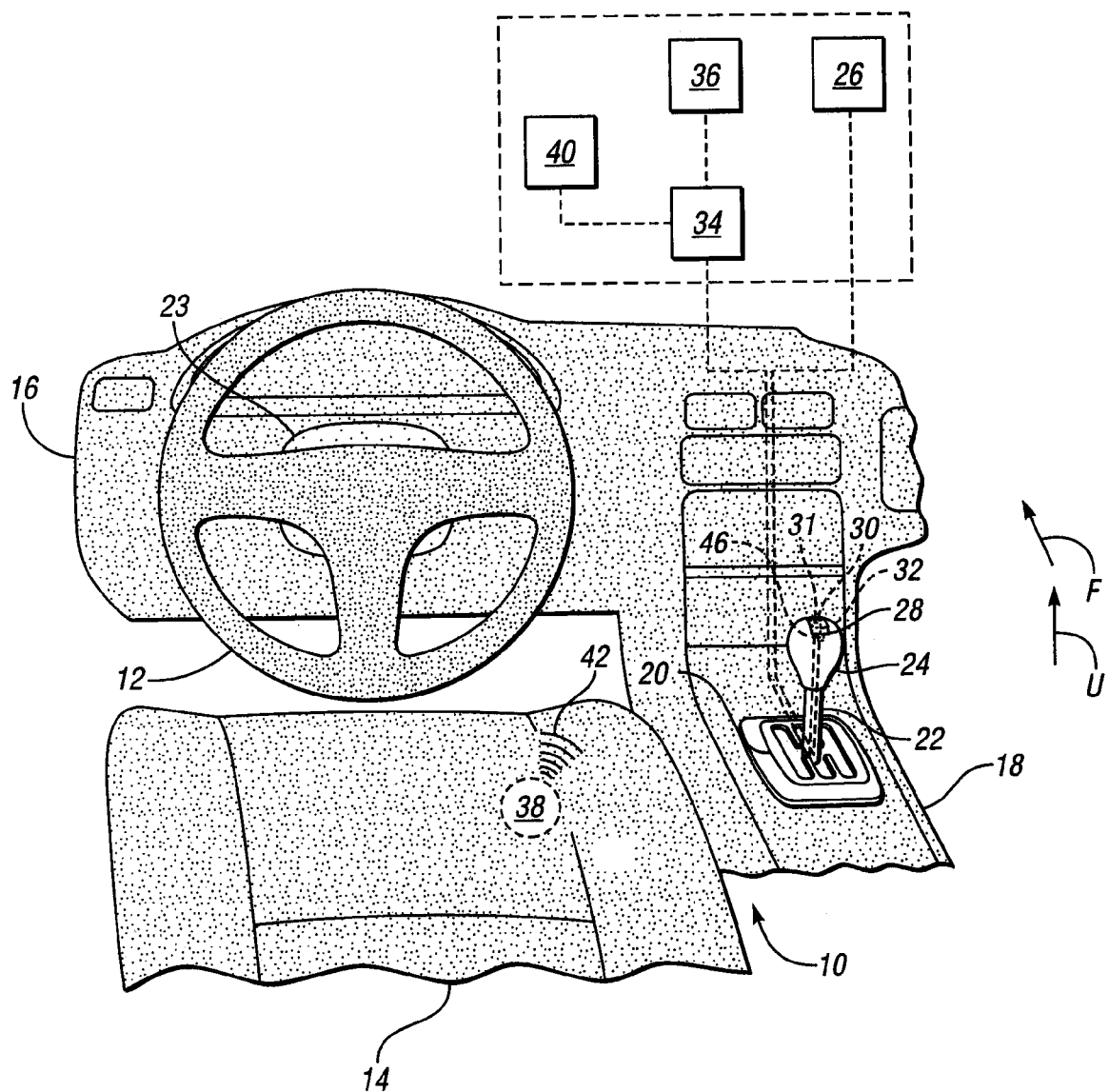
FIG. 1 is a schematic view of a vehicle interior.

Referring to FIG. 1, a vehicle interior is illustrated and referenced generally by numeral 10. The vehicle interior 10 of at least the depicted embodiment has a steering wheel 12, a vehicle seat 14, and a dashboard 16. The steering wheel 12, the vehicle seat 14, and the dashboard 16 are merely illustrative of features of the vehicle interior 10. Thus, any suitable steering control, seating arrangement, and cockpit layout is contemplated within the scope of the present invention.

The vehicle interior 10 may have a console 18 mounted next to the vehicle seat 14. In the embodiment illustrated, the console 18 supports a shifter assembly 20 within reach of a driver. In another embodiment, the console has a storage compartment or any other feature which is desired.

The shifter assembly 20 has a lever 22 which is mounted to the console 18 in the depicted embodiment. In another embodiment, the lever 22 is mounted directly to a floor portion of the vehicle interior 10. In yet another embodiment, the lever 22 of the shifter assembly 20 is mounted directly to a steering a column 23 of the steering wheel 12. Any suitable location to mount the lever 22 of the shifter assembly 20 in the vehicle interior within reach of a driver is contemplated within the scope of the present invention.

Figure 2:
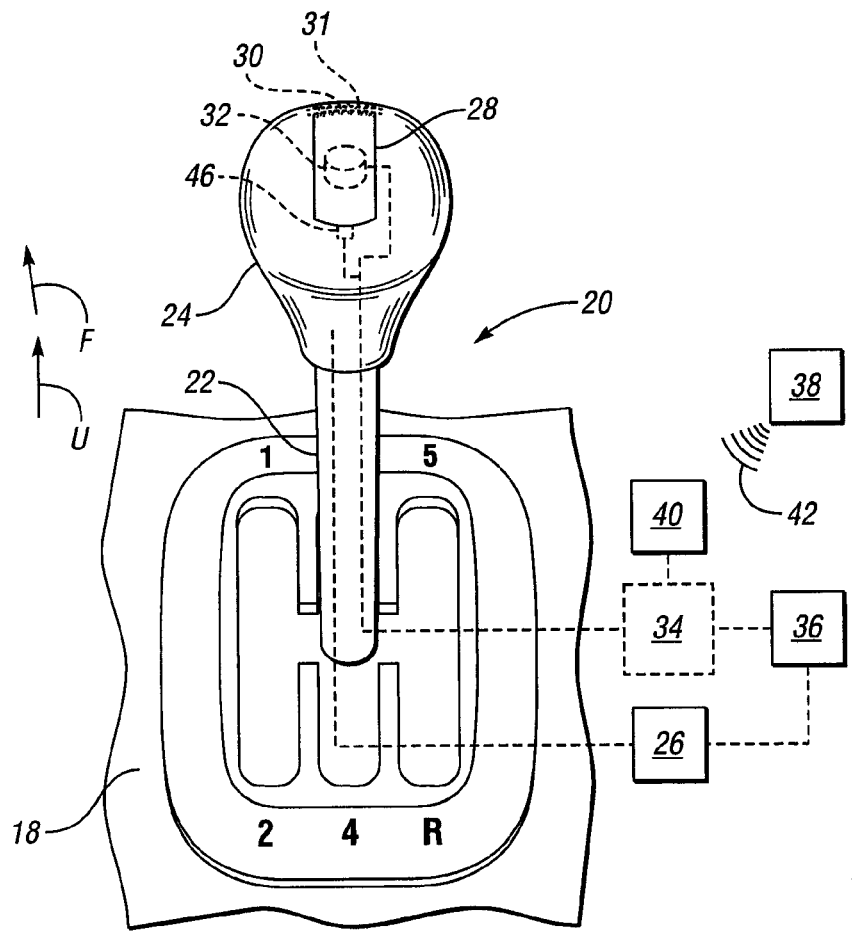
FIG. 2 is a perspective view of a shifter assembly of the vehicle interior of FIG. 1.

Referring now to FIGS. 1 and 2, the shifter assembly 20 has a handle 24 for the driver to grasp and utilize to operate the shifter assembly 20. The handle 24 may be any suitable size or shape so that a hand of the driver easily grasps the shifter assembly 20. In the present embodiments, the handle 24 is spherically shaped. In another embodiment, the handle 24 may be ergonomically designed and/or have an asymmetric shape.

The shifter assembly 20 controls a transmission 26 of the vehicle interior 10. In one embodiment, the transmission 26 is any manual transmission known in the art. In another embodiment, the transmission 26 is any automatic transmission known in the art.

In the embodiment illustrated, an ignition button 32 is mounted on the handle 24 for operation by a thumb or finger of a driver. Locating the ignition button 32 on the shifter assembly 20 allows the driver to use only one hand to start the vehicle and operate the shifter assembly 20.

The ignition button 32 is connected to an engine 36 of the vehicle and may be directly connected to the engine 36. The engine 36 is mounted to the vehicle. In another embodiment, the ignition button 32 is connected to an engine control unit (ECU) 34 which is in operative connection with the engine 36. Any suitable engine 36 and ECU 34 that are known in the art may be utilized.

The shifter assembly 20 has a cover 28 mounted on the handle 24 to protect the ignition button 32. In the embodiment illustrated, the cover 28 has an arcuate shape to correspond with the spherical shape of the handle 24. The shape of the cover 28 may correspond to any shape of the handle 24 to provide a visually attractive appearance. The cover 28 may be any size or shape which covers at least a portion of the handle 24.

The cover 28 is pivotally mounted to the handle 24 by a hinge 30 in the depicted embodiment. The pivotal connection provided by the hinge 30 allows the cover 28 to have a closed position and an opened position. In the closed position, the cover 28 rests on or near the handle 24. Any suitable pivotal mounting between the cover 28 and the handle 24 is contemplated within the scope of the present invention.

The ignition button 32 is mounted beneath the cover 28 in the closed position as illustrated. The ignition button 32 is exposed when the cover 28 moves from the closed position illustrated to an opened position. The cover 28 in the closed position prevents a driver or child from unintentional actuation of the ignition button 32.

When the cover 28 is in the opened position, the driver can press the ignition button 32 to actuate the ECU 34 and/or the engine 36. In another embodiment, the ignition button 32 is electronically activated by a sensor oriented in the ignition button 32 and activated by the driver, for example.

When the cover 28 is in the closed position as illustrated, a release mechanism 46 is mounted in the handle 24 to retain the cover 28 in the closed position. In one embodiment, the release mechanism 46 consists of a striker mounted on the cover 28 and a latch mounted in the handle 24. Any suitable release mechanism 46 is contemplated within the scope of the present invention.

A portable transmitter 48 can be carried or transported by the driver to release the release mechanism 46. Once the release mechanism 46 is released, the cover 28 is manually opened by the driver, in one embodiment. In another embodiment, the cover is automatically opened through used of a torsion spring 31 mounted on the hinge 30.

A receiver 40 in communication with the transmitter 48 is located inside or outside of the vehicle interior for communication with the transmitter 38. The transmitter 38 sends out a wireless signal 42 which is received by the receiver 40. The receiver 40 is connected to the release mechanism 46 to actuate the release mechanism 46 to release the cover 28. In one embodiment, the receiver 40 is connected to the ECU 34 and the ECU 34 is connected with the release mechanism 46. Any connection between the receiver 40 and the release mechanism 46 is contemplated within the scope of the present invention.

Figure 3:
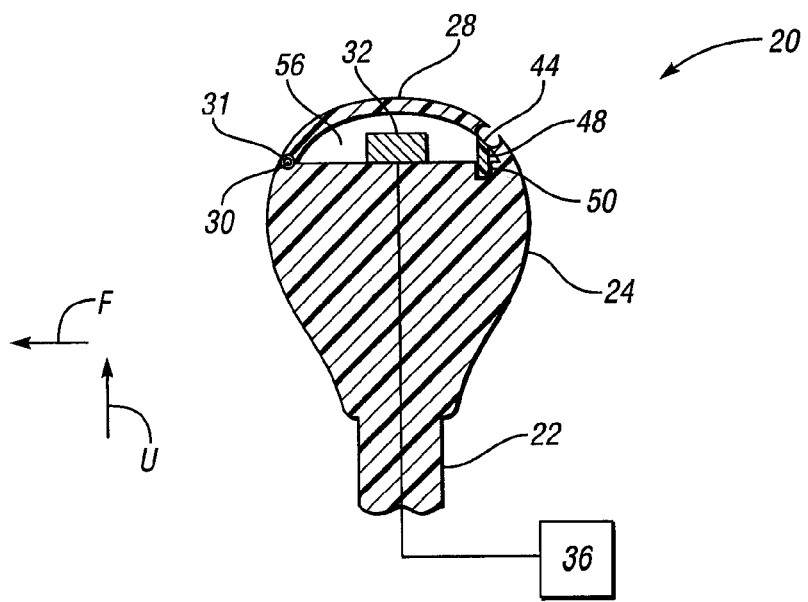
FIG. 3 is a cross-sectional view of the shifter assembly of FIG. 1.

Referring to FIG. 3, a cross-sectional view of the shifter assembly 20 of FIG. 1 is illustrated. In one embodiment, the lever 22 and the handle 24 are manufactured together out of the same material. In another embodiment, the lever 22 is manufactured separately from the handle 24 and joined together through the use of a fastener or adhesive.

In at least one embodiment, a ridge 44 is collectively formed in the handle 24 and the cover 28 to allow a driver to pivot the cover 28 from the closed position illustrated to an opened position by inserting his finger into the ridge 44 and pressing in an upward direction U and a forward direction F. If a striker 48 is mounted in the cover 28 and a latch 50 is mounted in the handle 24, the driver would be required to exert a predetermined force on the cover 28 to open the cover 28 from the closed position. In another embodiment, a torsion spring 31 is mounted on the hinge 30 to urge the cover 28 to the closed position and requires the driver to exert a predetermined force on the cover 28 to open the cover 28 from the closed position. Once the driver exerts the predetermined force on the cover 28, the cover 28 freely pivots about the hinge 30, in one embodiment. In another embodiment, the cover automatically pivots to the opened position after the driver exerts the predetermined force on the cover 28.

The handle 24 may have a recess 56 formed in the top surface of the base 24. The ignition button 32 is mounted in the recess 56 in the embodiment illustrated. The cover 28 in the depicted embodiment is mounted to the handle 24 and within the recess 56 so that the remaining top surface of the handle 24 and a top surface of the cover 28 form a generally flush surface when the cover 28 is in the closed position.

Figure 4:
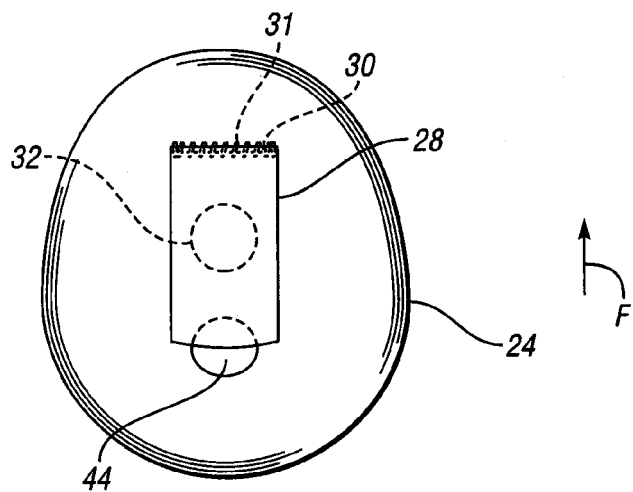
FIG. 4 is a top plan view of the shifter assembly of FIG. 1.

Referring now to FIG. 4, the handle 24 of the shifter assembly 20 of FIG. 1 is illustrated from the top of the handle 24. The handle 24 and the cover 28 may collectively provide a ridge 44 for the driver to use to open the cover 28 from the closed position to the opened position. The ridge 44 may be formed in the top surface of the handle 24 and on an underside of the cover 28. The driver may insert his thumb or finger into the ridge 44 and after exerting a predetermined force, lift the cover 28 manually to pivot the cover 28 about the hinge 30 from the closed position to the opened position. The ridge 44 may be used in combination with the release mechanism illustrated in FIG. 3 or any suitable release mechanism.

Figure 5:
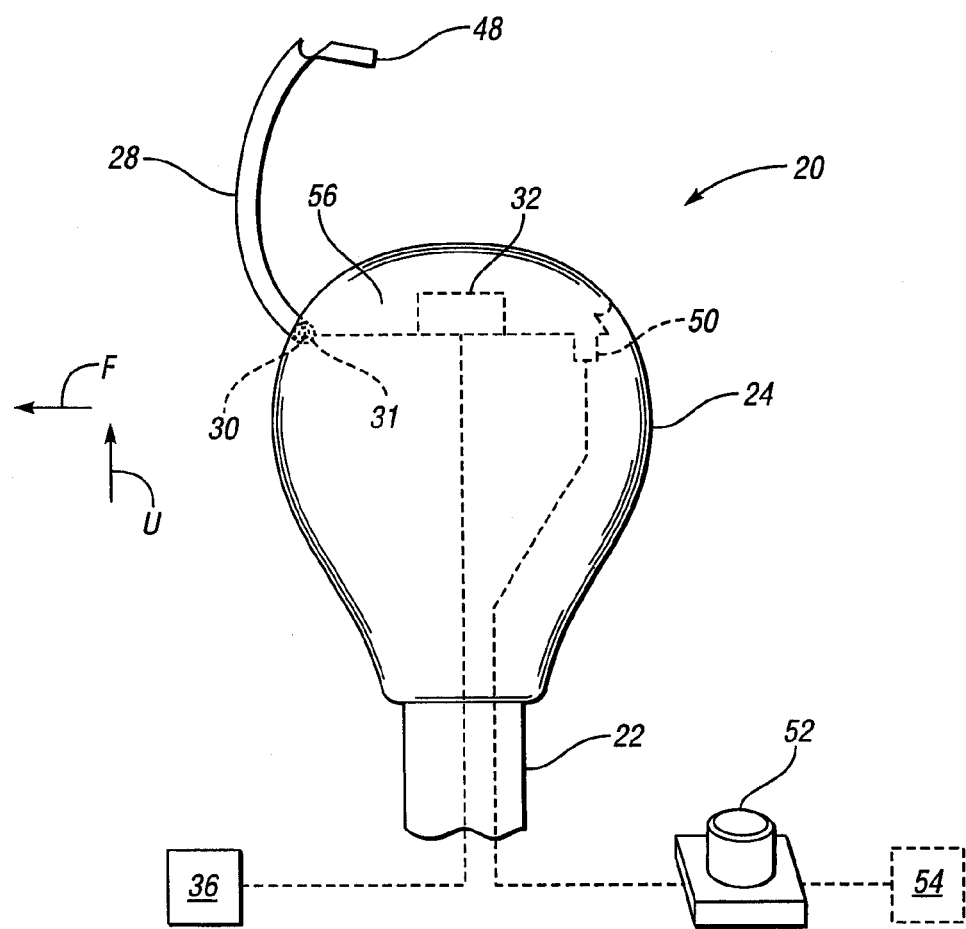
FIG. 5 is a side perspective view of the shifter assembly of FIG. 1.

Referring now to FIG. 5, the shifter assembly 20 of FIG. 1 is illustrated with the cover 28 in an opened position. The cover 28 has pivoted about the hinge 30 in forward direction F and upward direction U. The forward direction F is towards the front of the vehicle interior of FIG. 1 and the upward direction U is towards a roof of the vehicle interior of FIG. 1.

In the embodiment illustrated, a latch 50 is in operable connection with a release button 52, which may be mounted within an interior of the vehicle. The release button 52 is in operable connection with the latch 50 to send a signal to the latch 50 to release the striker 48 to allow the cover 28 to move to the opened position. In one embodiment, the release button 42 may mechanically release the latch 50. In another embodiment, the release button 42 may send an electrical signal to release the latch 50. In another embodiment, an actuator 54 is operably connected to the release button 52 to actuate the release button 52 to release the striker 48 from the latch 50.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A shifter assembly mounted in an interior of a vehicle in operable connection with a vehicle transmission for selecting a mode of the transmission, the shifter comprising:
   a base member mounted to the vehicle interior and translatable relative to the vehicle interior;
   an ignition button mounted on a top surface of the base member and operatively connected to an engine of the vehicle such that actuation of the ignition button starts the engine of the vehicle; and
   a cover pivotally connected to the top surface of the base member to generally cover the ignition button, the cover having a closed position and an opened position.

2. The shifter assembly of claim 1 wherein the top surface of the base member and a top surface of the cover in a closed position collectively form a generally flush surface.

3. The shifter assembly of claim 1 further comprising a release mechanism oriented within the base member and in selective connection with the cover for releasing the cover to the opened position.

4. The shifter assembly of claim 3 further comprising:
   a portable transmitter for conveying an unlock signal when located in the vehicle interior; and
   a receiver mounted on the vehicle and in operative communication with the release mechanism wherein receipt of the unlock signal by the receiver causes the release mechanism to release the cover to the opened position.

5. The shifter assembly of claim 1 wherein the pivotal connection further comprises a hinge connecting the base member and the cover member.

6. The shifter assembly of claim 5 wherein the hinge is provided between the base member and the cover.

7. The shifter assembly of claim 6 wherein the cover is translatable to pivot about the hinge in a generally upward and forward direction relative to the vehicle when opened.

8. The shifter assembly of claim 1 wherein the base member further comprises:
   a lever mounted to the vehicle interior and translatable relative to the vehicle interior; and
   a handle connected to the lever for grip by a hand of a driver to translate the base member.

9. The shifter assembly of claim 8 wherein the handle is generally spherically shaped.

10. The shifter assembly of claim 8 wherein the cover is generally arcuate.

11. The shifter assembly of claim 8 wherein the top surface of the handle has a recess formed therein.

12. The shifter assembly of claim 11 wherein the ignition button is oriented in the recess.

13. The shifter assembly of claim 11 wherein the recess is sized to receive the cover such that the top surface of the handle and a top surface of the cover in a closed position collectively form a generally flush surface.

14. The shifter assembly of claim 11 wherein the recess is longitudinally and centrally disposed on the base member.

15. A vehicle comprising:
   a shifter mounted in an interior of the vehicle in operable connection with a vehicle transmission for selecting a mode of the transmission, the shifter being translatable relative to vehicle interior;
   an ignition button mounted on a top surface of the shifter and operatively connected to an engine of the vehicle such that actuation of the ignition button starts the engine of the vehicle;
   a cover pivotally connected to the top surface of the shifter to generally cover the ignition button, the cover having a closed position and an opened position; and
   a release button mounted in the vehicle interior a distance from the shifter, the release button in operative connection with the cover to retain the cover in the closed position and release the cover to the opened position upon activation thereof.

16. The vehicle of claim 15 wherein the actuation of the release button is manually operated.

17. The vehicle of claim 15 wherein the actuation of the release button is electrically operated.

18. The vehicle of claim 15 wherein the release button is released from the cover mechanically upon actuation of the release button.

19. The vehicle of claim 15 wherein the release button is released from the cover by an electrical signal upon actuation of the release button.

20. A vehicle comprising:
   a shifter mounted in an interior of the vehicle in operable connection with a vehicle transmission for selecting a mode of the transmission, the shifter being translatable relative to vehicle interior;
   an ignition button mounted on a top surface of the shifter and operatively connected to an engine of the vehicle such that actuation of the ignition button starts the engine of the vehicle; and
   a cover pivotally connected to the top surface of the shifter to generally cover the ignition button, the cover having a closed position and an opened position;
   wherein a predetermined force is required to actuate the cover from the closed position to the opened position.

* * * * *